United States Patent
Robert et al.

(10) Patent No.: US 8,457,360 B2
(45) Date of Patent: Jun. 4, 2013

(54) DETECTION OF VEHICLES IN AN IMAGE

(75) Inventors: Kostia Robert, Kensington (AU); Jun Yang, Kingsford (AU); Yang Wang, Botany (AU); Jian Zhang, Eveleigh (AU)

(73) Assignee: National ICT Australia Limited (AU)

( * ) Notice: Subject to any disclaimer, the term of this patent is extended or adjusted under 35 U.S.C. 154(b) by 220 days.

(21) Appl. No.: 13/119,903

(22) PCT Filed: Sep. 25, 2009

(86) PCT No.: PCT/AU2009/001272
§ 371 (c)(1),
(2), (4) Date: Jun. 6, 2011

(87) PCT Pub. No.: WO2010/034065
PCT Pub. Date: Apr. 1, 2010

(65) Prior Publication Data
US 2011/0293141 A1    Dec. 1, 2011

(30) Foreign Application Priority Data
Sep. 25, 2008 (AU) ................................ 2008905012

(51) Int. Cl.
*G06K 9/00* (2006.01)
(52) U.S. Cl.
USPC .......................................................... 382/104
(58) Field of Classification Search
USPC .......... 382/100–107; 340/907–911, 933–935; 348/113–136
See application file for complete search history.

(56) References Cited

FOREIGN PATENT DOCUMENTS
JP      2000-348282     12/2000
WO    WO 2010/006361     1/2010

OTHER PUBLICATIONS

Stefan Hinz et al., "Vehicle Detection in Aerial Images Using Generic Features, Grouping, and Context", DAGM 2001, LNCS 2191, pp. 45-52, 2001.
Philip M. Birch et al., "Automated Vehicle Occupancy Monitoring", Opt. Eng. 43(8), Aug. 2004, pp. 1828-1832.
Tao Zhao et al., "Car Detection in Low Resolution Aerial Image", 2001 IEEE, pp. 710-717, 2001.
Rahul Garg et al., "Analysis of Vehicle Recognition Methods in Traffic Scenes", Computer Science Dept., Indian Institute of Technology, Delhi, Nov. 18, 2005, pp. 1-35.
PCT International Search Report and Written Opinion, PCT/AU2009/001272, Australian Patent Office, Oct. 2009, 7 pages.

(Continued)

*Primary Examiner* — Atiba O Fitzpatrick

(57) ABSTRACT

The invention concerns a traffic surveillance system that is used to detect and track vehicles in video taken of a road from a low mounted camera. The inventors have discovered that even in heavily occluded scenes, due to traffic density or the angle of low mounted cameras capturing the images, at least one horizontal edge of the windshield is least likely to be occluded for each individual vehicle in the image. Thus, it is an advantage of the invention that the direct detection of a windshield on its own can be used to detect a vehicle in a single image. Multiple models are projected (206) onto an image with reference to different points in the image. The probability of each point forming part of a windshield is determined based on a correlation of the horizontal edges in the image with the horizontal edges of the windshield model referenced at that point (220). This probability of neighboring points is used to possible detect a vehicle in the image (224). Aspects of the invention include a method, software and traffic surveillance system.

19 Claims, 7 Drawing Sheets

OTHER PUBLICATIONS

Wang et al., "Automatic Vehicle Detection Using Local Features—A Statistical Approach" 18th IPPR Conference on Computer Vision, Graphics and Image Processing, Aug. 21-23, 2005, pp. 1813-1820.

Betke et al., "Multiple Vehicle Detection and Tracking in Hard Real Time", Jul. 1996, 24 pages.

Sotelo et al., "Road Vehicle Recognition in Monocular Images", Jun. 20-23, 2005, 5 pages.

Sun et al., On-Road Vehicle Detection Using Optical Sensors: A Review, Oct. 2-6, 2004, 6 pages.

Chiu et al., "Real Time Recognition and Tracking System of Multiple Vehicles" Intelligent Vehicles Symposium, Jun. 13-15, 2006, pp. 478-483.

Hilario et al., "Multi-resolution Image Analysis for Vehicle Detection", IbPRIA 2005, LNCS 3522, 2005, pp. 579-586.

Collado et al., "Model Based Vehicle Detection for Intelligent Vehicles" 2004 IEEE Intelligent Vehicles Symposium, Jun. 14-17, 2004, pp. 572-577.

Coifman et al., A Real-Time Computer Vision System for Vehicle Tracking and Traffic Surveillance, Jun. 20-23, 2005, 33 pages.

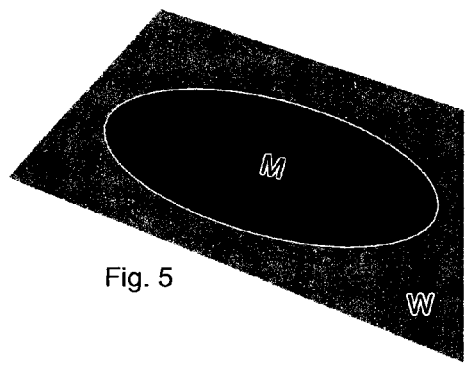
Fig. 5
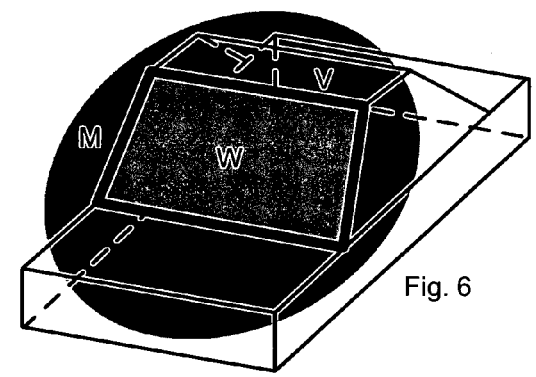
Fig. 6
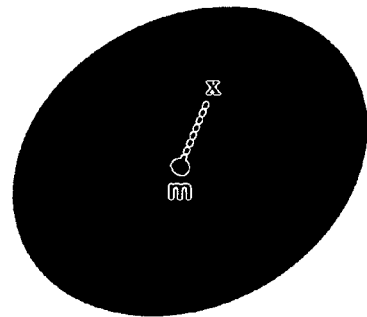
Fig. 7
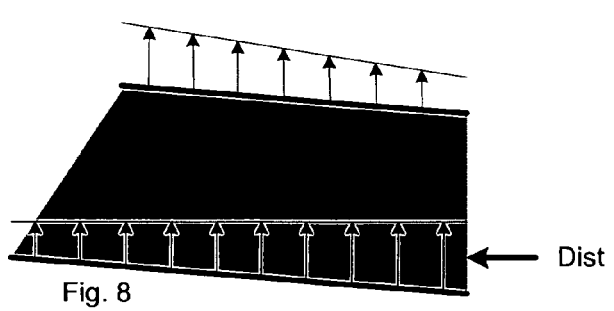
Fig. 8 — Dist

| camera no. | camera position | weather condition | windshields in selected frames (ROI) | | | detection rate (at 10% false alarm rate) |
|---|---|---|---|---|---|---|
| | | | training | tuning | testing | |
| camera 1 | on-street | sunny | 453 | 454 | 1375 | 82% |
| | | rainy | 562 | 556 | 1667 | 85% |
| | | cloudy | 694 | 694 | 2052 | 89% |
| camera 3 | roadside | sunny | 462 | 456 | 1370 | 79% |
| | | rainy | 556 | 568 | 1691 | 92% |
| | | cloudy | 532 | 531 | 1586 | 81% |

Fig. 10

DETECTION OF VEHICLES IN AN IMAGE

TECHNICAL FIELD

The invention concerns the detection of vehicles in an image. In particular, but not limited to, the invention concerns a traffic surveillance system that is used to detect and track vehicles in a time ordered sequence of images taken of a road from a low mounted camera to determine traffic information about the detected and tracked vehicles. Aspects of the invention include a method, software and traffic surveillance system.

BACKGROUND ART

Vehicle detection is a critical task in modern Intelligent Traffic Systems. To facilitate traffic monitoring and control, ITS systems generally require input of traffic information, such as traffic density, queue length, vehicle counting, vehicle position, vehicle velocity and vehicle type from a Traffic Scene Analysis (TSA) component. The more a TSA component can offer, the better the traffic state estimation can be achieved.

The increasing demand for the capability of producing rich information is the driving factor for combining Computer-Vision based systems with the traditional inductive-loop-based systems in recent years.

In the past two decades, many methods for vehicle detection in the context of traffic surveillance have been proposed in the computer vision community. Based on their technical approaches, they can be roughly divided into six categories:
background subtraction;
supervised-learning-based detector;
feature point detector;
foreground segmentation;
color segmentation; and
vehicle model matching.

SUMMARY OF THE INVENTION

In one aspect the invention provides a method of detecting a vehicle in an image, the method comprising the steps of:
(a) for each point of a set of points of the image, projecting a geometrical model of only a windshield on the image with reference to that point;
(b) detecting substantially horizontal edges in the image;
(c) determining the probability of each point of the set forming part of a windshield of a vehicle in the image based on correlation of the detected horizontal edges with the horizontal edges of the windshield model referenced at that point; and
(d) detecting a vehicle in the image based on a probabilities of neighbouring points.

The inventors have discovered that even in heavily occluded scenes, due to traffic density or the angle of low mounted cameras capturing the images, at least one horizontal edge of the windshield is least likely to be occluded for each individual vehicle in the image. Thus, it is an advantage of the invention that the direct detection of a windshield on its own can be used to detect a vehicle in a single image.

The method may further comprise the step of determining the set of points by:
determining the colour of each point in the image, this may be in the HSV colour space; and
classifying points as belonging to the set if the colour of that point is substantially similar to predetermined windshield colours. The predetermined colours may depend on the illumination in the image and/or weather condition captured in the image.

The set of points may be considered a mask of the image, where the mask forms a shape (i.e. mask shape).

The geometric model of windshield may be defined in three dimensions (e.g. 3D real world). The step (a) of projecting the model on the image may be performed through perspective mapping and scaling the model accordingly.

Before or after step (c), the method may further comprises determining a probability that each point of the set is part of a windshield in the image based on a mask shape formed by that point and its neighbouring connected points in the image that belong to the set.

The method may further comprise the step of determining whether the projected windshield model is likely to be a low contrast vehicle. Such as, by determining whether the shape formed by a set of points in the mask that includes the reference point of the windshield model is proportionately too large to be considered to define the shape of that windshield model. The method may also comprise selecting a method for using the mask shape to determine the probability of each point based on whether it is likely to be a low contrast vehicle or not.

Where the projected windshield model is likely to model to a low-contrast vehicle, the method of determining the probability of that point is part of a windshield may be based on the proximity of that point to the centre of the mask shape.

Where the windshield model is not likely to model to a low-contrast vehicle, the method of determining the probability that the point is part of a windshield may be based on the proportion the shape of that windshield model referenced at that point is common with the mask shape.

For each point belonging to (i.e. lying on) the boundary of projected windshield model, the distance from the point to the closest detected edge segment may be calculated. Step (c) may be based on the average distance between the boundary points of projected windshield model and the detected horizontal edges in the image. Step (d) may comprise generating a confidence map of the image. The confidence map may be generated based on a statistical framework, such as a Bayesian formulation, where the data of the formulation is based on the colour (shape) and edge probabilities above. The Bayesian formulation may depend on whether it is determined that the windshield model is likely to belong to a low contrast vehicle.

Step (d) may comprise clustering points in the confidence map to identify points that represent the highest probability that they form part of a windshield (i.e. local maximums).

The image may be an image in a sequence of images, and the method may further comprise tracking a detected vehicle in subsequent images of the sequence.

The method may further comprise the step of receiving the image in real time and performing the method in real time. A point may be a pixel or multiple pixels. The order of steps (a) and (b) is not important. The reference to a point in step (a) may be the centre of the windshield model.

A further aspect of the invention includes software, that when installed on a computer, causes the computer to operate in the manner described above. In yet a further aspect the invention is a computer based traffic surveillance system operable to perform the invention described above.

BRIEF DESCRIPTION OF THE DRAWINGS

An example of the invention will now be described with reference to the accompanying drawings, in which:

FIG. 5 schematically shows the shape matching for high-contrast vehicles;

FIG. 6 schematically shows the determination of the likelihood of low-contrast vehicles;

FIG. 7 schematically shows the shape matching for low-contrast vehicles;

FIG. 8 schematically shows edge matching for high-contrast vehicles;

FIG. 10 is a table showing the result of implementing this example of the current invention.

BEST MODES OF THE INVENTION

Figure 1:
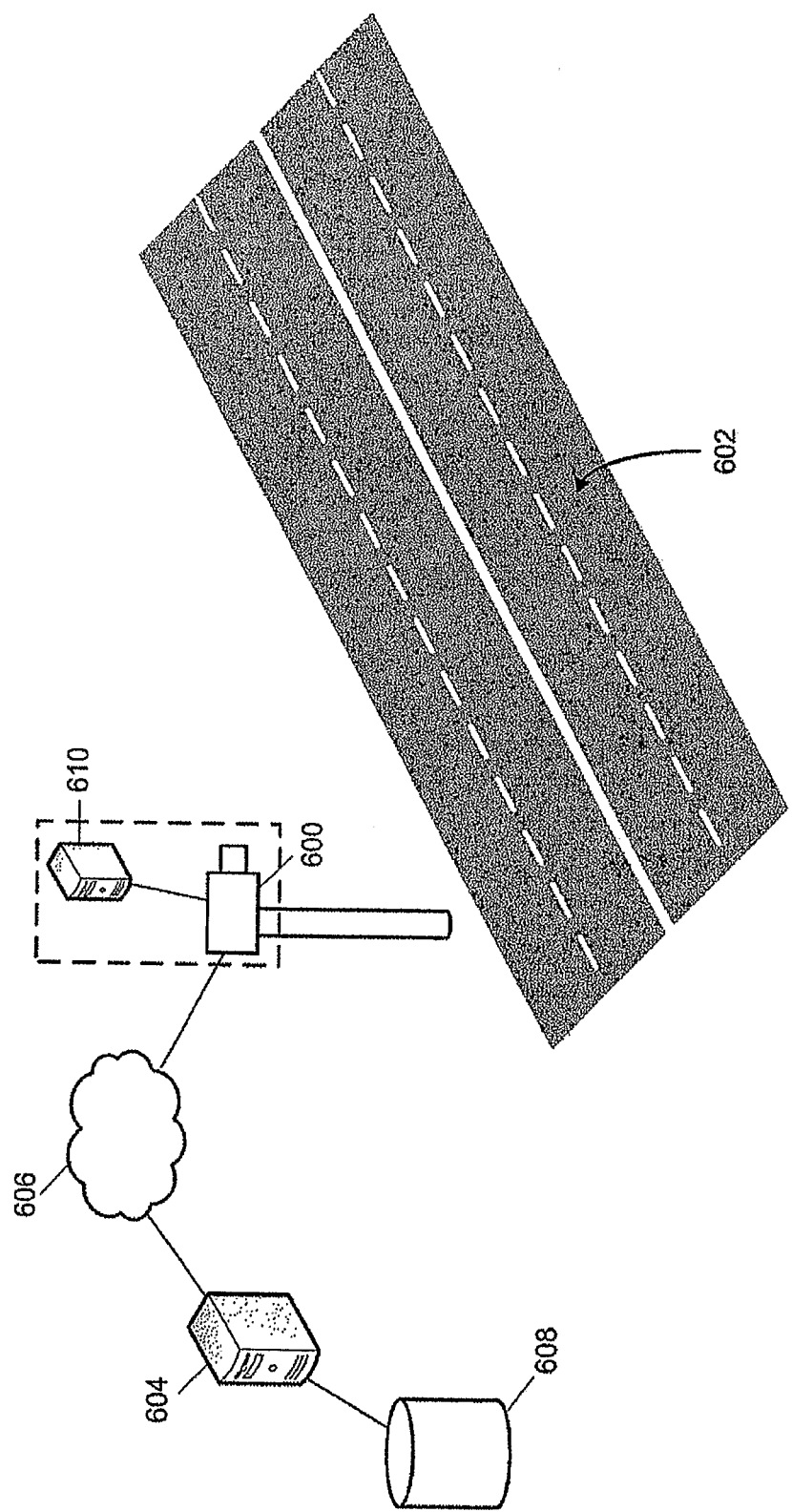
FIG. 1 is a schematic representation of the system of an example of the current invention.

The following is a description of a computer vision traffic surveillance system. As shown in FIG. 1 the system comprises a low mounted (i.e. low angled) CCD camera 600 that captures a video of a traffic scene 602 having at least multiple lanes of vehicle traffic travelling in the same direction. By being low mounted the images captured by the camera include a frontal view of the vehicle (i.e. not aerial). The video is comprised of a time ordered sequence of images.

Figure 3:
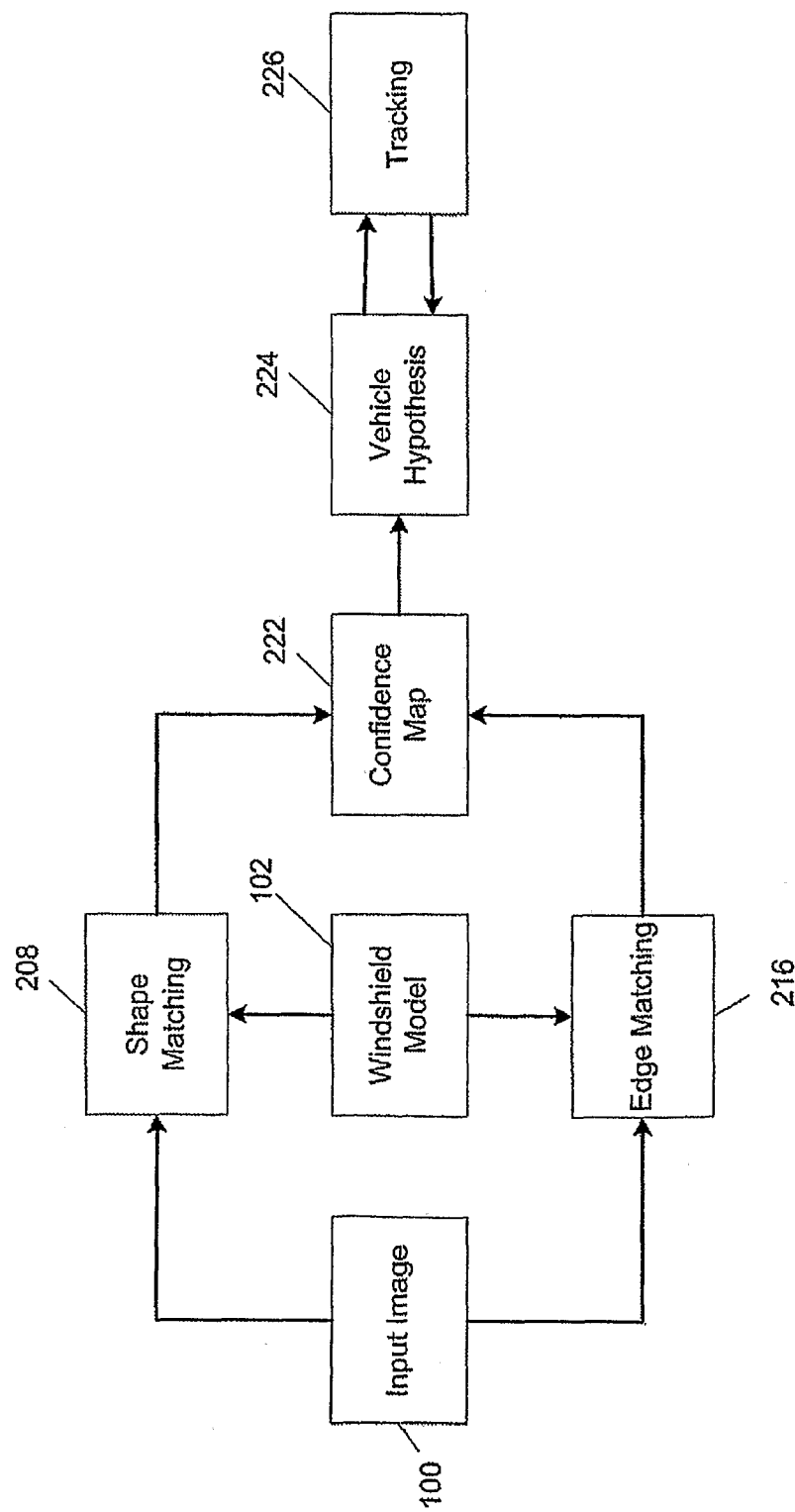
FIG. 3 is an overall flow diagram of the method of this example of the current invention.

The camera 600 is connected to a computer 604 via the internet 606 or any other suitable computer network. Using the computer network, the images captured by the camera 600 are received by the computer 604 at an input port and stored in an associated datastore 608. The computer has installed software that causes the processor to retrieve the images and process them in real-time or off line in order to detect vehicles in the images and then extract further traffic data concerning the traffic in the captured images. An example of the method of processing these images will now be described in further detail and with reference to FIG. 3.

The inventors have identified that for low-angle cameras, if there are any occlusions in the captured images, the windshield is probably the least likely part to be occluded for each individual vehicle. Thus windshield can be used as reliable identifier for vehicles. The vehicle detection problem is solved in this example by finding individual windshields in video images given the observation of a set of features.

Figure 2:
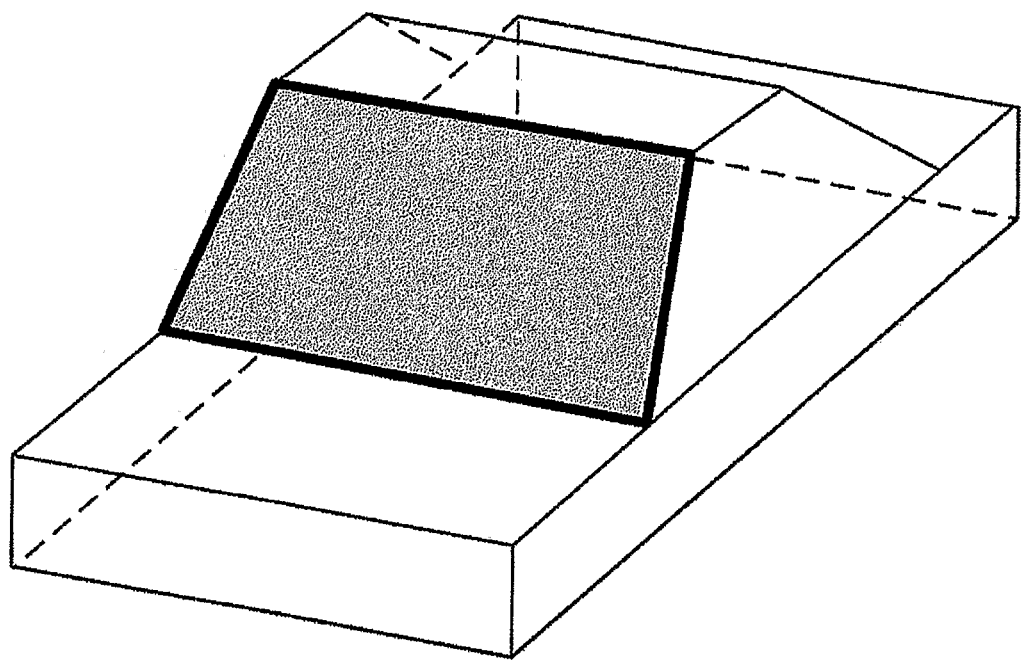
FIG. 2 is a schematic representation of an example windshield model.

In this example, two types of feature matching are used: shape s and edge e. For each pixel x, p(w|s,e) represents the posterior probability being the center of a windshield. Briefly, the received images 100, and shape 208 and edge matching 216 is performed based on a geometric windshield model 102. A sample windshield model is shown in FIG. 2.

The probability of the pixel being the center of a windshield is then estimated by the fusion of shape matching and edge matching likelihood to produce a confidence map 222. From this confidence map, and vehicle hypotheses are inferred in every image 224. Finally the detection is integrated with tracking to reinforce each other 226. This is known as a detect-then-track framework.

Further details of the method of this example will now be described with reference to FIG. 4.

Bayesian Formulation

In this work, some special considerations need to be given for low-contrast vehicles, where the appearance of the windshield is close to that of the vehicle body and the windshield boundaries are barely visible. In this case, shape and edge matching become non-discriminative and some approximation is required. A: binary variable b is introduced to differentiate two types of vehicles, e.g. b=0 indicates a high-contrast vehicle and b=1 indicates low-contrast vehicle. A vehicle can have low contrast when its color is dark (e.g. dark, gray, black, dark blue), or when it is under a shadow area. The posterior probability becomes:

$$p(w|s,e)=p(w,b=0|s,e)+p(w,b=1|se) \quad (1)$$

Using Bayes' rule and assuming independence between different features, the above posterior can be further expressed as:

$$p(w|s,e)=p(w|b=0,s,e)p(b=0|s,e)+p(w|b=1,s,e)p\\(b=1s,e) \propto p(s|w,b=0)p(e|w,b=0)p(b=0|s)+ap(s|w,\\b=1)p(b=1|s) \quad (2)$$

Here $\alpha$ can, be viewed as a constant parameter and its value is fixed in subsequent computations.

Image Preprocessing

At first, a region of interest of each image is determined that will be common to all images. The ROI includes the lanes of traffic that vehicle detected will be performed on.

Camera calibration is also performed offline by assuming planar road surface. The mapping parameters resulting from camera calibration allows us to project the 3D windshield model to any position in the image.

The two low-level image features of interest, revealing a windshield presence, are the color and the edge.

The edges are extracted on each frame by a common edge detector. The two true horizontal top and bottom edges of a windscreen are relatively salient comparing to vertical edges. However, a common edge detector may not see the edges from low-contrast vehicles. In this case, the windshield detector only relies on the matching of the shape (based on color), and more attention is needed to track the edges (see tracking part).

Color information is generally difficult to handle as it is not invariant to illumination changes. However, the windshield appearance on the camera image has some common properties. It is generally seen as a grayish or bluish almost uniform region with low saturation. It is black at night-time with possible specular reflections. At day-time the windshield generally looks dark and sometimes bright where it reflects the sky. Under the sun, the windshield appears more transparent and shows the objects and persons behind. From these observations, it is better to use a different color space than the original ROB, with more discriminative and less correlated color channels. Thus the first step of the color classification is color conversion. The Saturation S is an appropriate channel as it has some level of illumination invariance, being only dependant on surface albedo and camera's characteristics. The HSV color space may therefore by used instead of ROB. Likewise, the normalized b color channel has proven good discrimination of windshield color. This may suggest using an application-based hybrid color space to learn and classify the windshield pixels.

The color likelihood of windshield is learned from different illuminations such as sunny, shadow, overcast weather, lighted night-time scene (see discussion of parameter learning below). Then, the learned color range is used to supervise a pixel classification scheme off-line.

Figure 4:
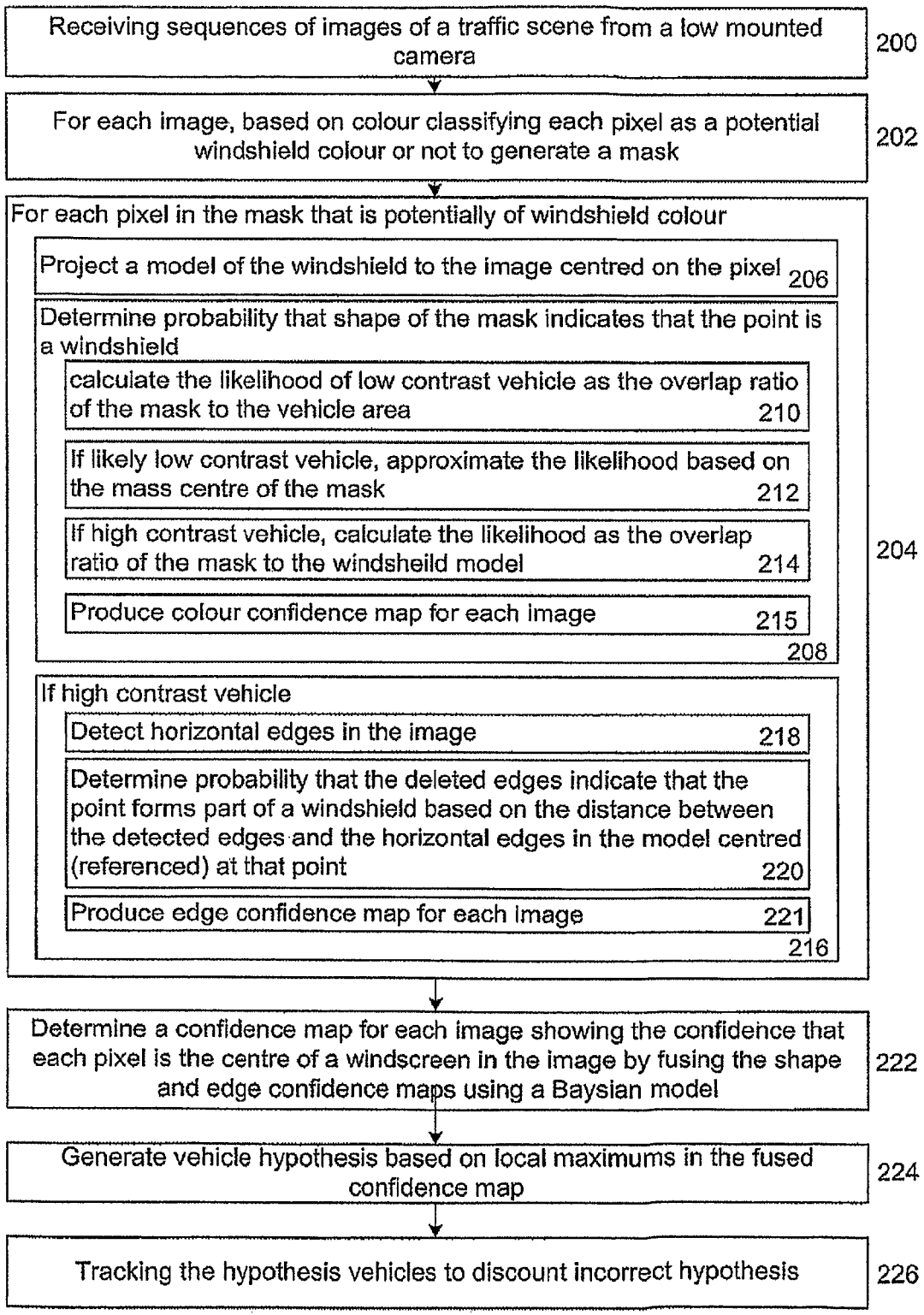
FIG. 4 is a more detailed flow chart of the real-time processing of images of this example of the current invention.

In the real-time process, the sequence of images of a traffic scene is received 200 by computer 604 where the method of FIG. 4 is performed. Next, every pixel of the detection region (region of interest) of each image is classified to know whether it is a potential windshield colour or not 202. This step yields to a binary image M of each image. This mask can further be enhanced using morphological operations. It is, possible to update the classifier on-line, based on the color of the detected windshields.

Then, for each pixel in the mask M that was classified as a potential windshield colour 204, assuming it is the center of a windshield, then a three dimensional windshield model is projected 206 to the position of that pixel where the model is scaled according to the determined mapping of the model.

Shape Matching 208

Besides the windshield mask M, the following notation is given to facilitate further discussion. At each position in the image, suppose the pixels within the projected vehicle area constitute set V and pixels within the projected windshield area constitute set W.

The term p(s|w,b=0) measures the correlation, e.g. shape matching likelihood, for high-contrast vehicles. Referring to FIG. 5, in this case, windshield is distinguishable from the rest part of the vehicle and it is intuitive to calculate 214 the likelihood as the overlap ratio of mask M to windshield model V.

$$p(s \mid w, b = 0) \propto \frac{|M \cap W|}{|W|} \tag{3}$$

The posterior p(b=1|s) is the probability of low-contrast vehicle. Referring to FIG. 6. if the area of mask M over-qualifies a windshield, then it is suspected to be on a dark vehicle (i.e. a low contrast vehicle). Thus a natural measurement of this probability is to consider the relationship between M and the vehicle area V.

$$p(b = 1 \mid s) \propto \frac{|M \cap V|}{|V|} \tag{4}$$

The term p(s|w,b=1) gives the shape matching likelihood for low-contrast vehicles. Referring to FIG. 7, in the low-contrast, situation, the likelihood is approximated 212 based on the mass center of the corresponding connected component in M $$\ln\, p(s \mid w, b = 1) \propto \frac{\|x - m\|^2}{\sigma_1^2} \tag{5}$$

where m is the center of the connected component, and $\sigma_1$ is the size of windshield.

The result for all pixels in the mask we have a probability (i.e. confidence) value that that pixel is at the centre of a windshield in the image based on this colour (and shape) assessment. Combined, these probabilities produce a colour confidence map (i.e. confidence image) 215.

Edge Matching 216

For low-contrast vehicles, edge matching is very weak and ignorable, so only the high-contrast case needs to be considered in the stage of vehicle detection.

Usually horizontal edges are more salient and stable than vertical ones. To reduce complexity, only horizontal edges are utilized without introducing noticeable negative effect on performance. Horizontal edge segments are roughly extracted after applying an horizontal edge detector such as Sobel 218. Referring now to FIG. 8, now suppose the top and bottom boundaries of the projected windshield W are denoted by T and B, and a function Dist is constructed to calculate the distance of a pixel to the closest detected line segment. For each pixel, the edge correlation, e.g. matching likelihood, is then calculated 220 as the following.

$$\ln\, p(e \mid w, b = 0) \propto -\frac{1}{|T \cup B|} \sum_{i \in T \cup B} Dist(i) \tag{6}$$

The determined correlation could also be based on an the proportion of the detected edges is are within a predetermined distance from T or B, whether the detected edges are parallel or have similar length.

The result for all pixels in the mask we have a probability (i.e. confidence) value that that pixel is at the centre of, a windshield in the image based on this edge assessment. Combined, these probabilities produce an edge confidence map (i.e. confidence image) 221.

Hypothesis (Candidate) Generation

A confidence map is obtained according to Eq. (2) 222 that fuses both colour and edge confidence maps. The terms in Eq. (2) can be computed using Eq. (3)-(6), so that the confidence of each pixel is dependent on the colour and edge information of its neighbouring points such as the points within the corresponding projected windshield area W or vehicle area V (see FIG. 6).

Then vehicle hypotheses are inferred 224 by finding the local maximums. Clustering, in this example, the mean-shift algorithm is run on the confidence map at the positions of nodes of an irregular grid. Each node has a local window which is of the size of the projected windshield model, and the windows of neighboring nodes overlap each other by half of its width or height to make sure the map is densely covered. In this way, the points within a node are neighbouring points considered in this mean-shift analysis. After mean-shift convergence, local maximums whose confidence value are below a predefined threshold are deleted, and redundant detections are resolved by combining close local maximums whose windows overlap by more than one half of its height in the lane direction or just overlap in the direction perpendicular to the lane.

Figure 9:
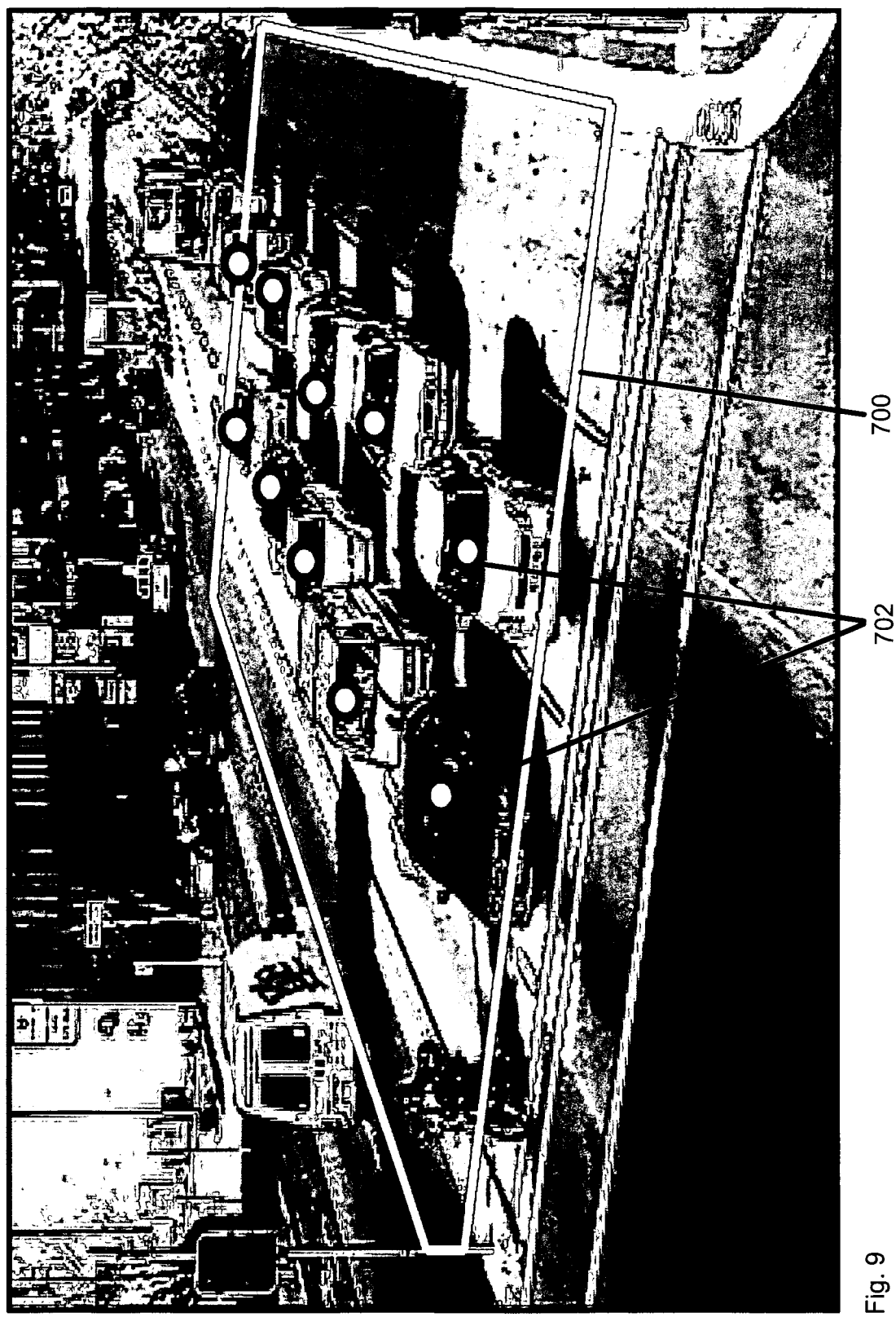
FIG. 9 is a sample image showing detected candidate vehicles in a region of interest (ROI)

A sample image is shown in FIG. 9, where the ROI is marked at 702, and the dots (two indicated at 702) is the centroid of a windshield of a candidate vehicle.

Vehicle Tracking 226

For video sequences, each vehicle candidate is tracked over time and updated with the new vehicle candidates from incoming images. A balance between increasing true detections and false detections is achieved by trajectory analysis.

Like any object detector, there may be missing detections and false positives. Tracking here serves two purposes: the first is to provide vehicle trajectories for traffic state estimation tasks; the second is to stabilize and verify detection results based on trajectory analysis.

The tracking filter is employed with position, velocity and may also include acceleration and windshield size in the state vector. The data association is based on spatial proximity. A detected windshield is associated with a trajectory only if the distance between the windshield and the most recent position of the trajectory is less than a threshold. To balance between the compensation of missing detections and the suppression of false alarms: a trajectory is admitted only if it begins with a span of length in which every element has associated observation; a trajectory is terminated if it experiences the noassociation situation for a span of length. Going beyond the boundaries of the image or ROI also ends the trajectory.

There are at least two ways to track windshield. The first one is to track the centroid of the detected windshield. This is a point tracker which could be designed by the simple and optimal Kalman filter assuming linear dynamic system driven by white noise. If these assumptions are violated, a nonlinear filter can be used instead such as Extended Kalman Filter, Unscented Kalman Filter or a Particle Filter. The problem of tracking only the centroid is that when the windshield gets occluded, the detected windshield centroid will be different from the real centroid, and will move upward. The windshield might even not be detected anymore by the shape and edge matching. The solution is to track the contour of the windshield. As the side edges can be confused with background, only the top and bottom edges should be tracked. The lower edge, will disappear first in case of occlusions. The upper edge is thus the most important. If the windshield is part of low-contrast vehicle and has not been tracked yet, the edges T (and B) need to be detected at first. It can be done for example by using a more robust local edge detector with rough a priori of its size and position. If the edges are not visible enough, the centroid can be tracked at first until it is possible the edge appears. There are many ways to track edges. The edge tracker may use an edge mask (gradient mask or Haar feature mask). Alternatively, the edge may be sampled into many edge points which are locally tracked based for example on Moving Edge Algorithm.

Parameter Learning

Prior to performing the method in real time, initial parameters must be learnt. Also, a statistic measure of the performance curve is used as a means to select feature and learn model-parameters in an offline process.

A database of video images is divided into three parts: one part is used to do essential training such as building color histogram; another part is used to learn the optimal value of parameters in our model; the rest part is used to test the performance, of the system. These three parts are denoted as training set, tuning set and testing set respectively.

The color distribution parameters for mask generation are learned from the samples in training set. Our general requirement is that M recover as many windshield area and as few non-windshield area as possible. Mask generation can be performed on the tuning set based on different features (color histogram or bottomhat operator), and use AUC (Area Under Curve) of the ROC (Receiver Operating Characteristic) curve as a means to select the feature. The calculation of true positive rate and false positive rate is based on individual pixels.

It is an advantage of this example that very few parameters are required leading to easier and less expensive installation of the system Results As shown in the table of FIG. 10, the algorithm is quantitatively evaluated on the testing sets of six sequences involving two low-angle (7 m high) cameras and three weather (sunny, cloudy, and rainy) conditions. On average, the algorithm achieves a detection rate of above 80% at a false alarm rate of 10%.

It will be appreciated by persons skilled in the art that numerous variations and/or modifications may be made to the invention as shown in the specific embodiments without departing from the scope of the invention as broadly described.

For example, once the windshield is detected and tracked, it is possible to classify the vehicle. A windshield with a large size is likely to correspond to a bus or coach. Different geometrical models may also be used, with different models each associated with a particular classification.

Once vehicles and have detected and tracked, this information can be used to determine further information about the traffic scene that will be of use to a ITS. This includes, traffic density, traffic flow and vehicle counting. More specific information about each vehicle can be determined such as vehicle position and speed.

The present embodiments are, therefore, to be considered in all respects as illustrative and not restrictive.

The invention claimed is:

1. A method of detecting a vehicle in an image, the method comprising the steps of:
   (a) for each point of a set of points of the image, projecting a geometrical model of only a windshield on the image with reference to that point;
   (b) detecting substantially horizontal edges in the image;
   (c) determining the probability of each point of the set forming part of a windshield of a vehicle in the image based on correlation of the detected horizontal edges with the horizontal edges of the windshield model referenced at that point; and
   (d) detecting a vehicle in the image based on a probabilities of neighbouring points.

2. A method according to claim 1, wherein the method further comprising the step of determining the set of points by:
   determining the colour of each point in the image; and
   classifying points as belonging to the set if the colour of that point is substantially similar to predetermined windshield colours.

3. A method according to claim 2, wherein the predetermined colours depend on the illumination in the image and/or weather condition captured in the image.

4. A method according to claim 1, wherein before or after step (c), the method further comprises determining a probability that each point of the set forming part of a windshield of a vehicle in the image based on a shape formed by that point and its neighbouring connected points in the image that belong to the set.

5. A method according to claim 4, wherein determining the probability of that point is part of a windshield is based on the correlation of a shape of the projected windshield model referenced at that point and the shape formed by that point and its neighbouring connected points in the image that belong to the set.

6. A method according to claim 4, wherein determining the probability of that point is part of a windshield is based on the proximity of that point to the centre of the shape formed by that point and its neighbouring connected points in the image that belong to the set.

7. A method according to claim 4, wherein determining the probability that the point is part of a windshield is based on the proportion the shape of that windshield model referenced at that point is common with the shape formed by that point and its neighbouring connected points in the image that belong to the set.

8. A method according to claim 4, wherein the method further comprises the step of determining whether the projected windshield model is likely to be a low contrast vehicle in the image and selecting a method for using the shape formed by that point and its neighbouring connected points in the image that belong to the set accordingly.

9. A method according to claim 1, wherein step (c) is based on an average distance between points lying on the boundary of a projected windshield model and the detected horizontal edges in the image.

10. A method according to claim 1, wherein step (d) comprises generating a confidence map of the points in the image.

11. A method according to claim 4, wherein step (d) comprises using a statistical framework to fuse the probability of each point determined in step (c) with the probability of the same point determined by claim 4.

12. A method according to claim 11, wherein step (d) comprises clustering the probability of points in the set to identify points representing a highest probability that they form part of a windshield.

13. A method according to claim 1, wherein the image is an image in a sequence of images, and the method further comprises tracking a detected vehicle in subsequent images of the sequence.

14. A method according to claim 1, wherein the model of the windshield is defined in three dimensions and the step (a) of projecting the model on the image is performed through perspective mapping and scaling the model.

15. A method according to claim 1, wherein the method further comprises the step of receiving the image in real time and performing the method in real time.

16. Software, that when installed on a computer, causes the computer to operate to perform the method according to claim 1.

17. A computer based traffic surveillance system comprising:
   an input port to receive an image; and
   a processor operable to process the image to detect an vehicle in the image in accordance with method described in claim 1.

18. A method according to claim 1, wherein the windshield is a front windshield or a rear windshield.

19. A method according to claim 1, wherein the probability determined in step (c) is representative of confidence that the point forms part of the windshield.

* * * * *